US007511602B2

(12) United States Patent
Huntzicker

(10) Patent No.: US 7,511,602 B2
(45) Date of Patent: Mar. 31, 2009

(54) KEYLESS ENTRY MODULE AND METHOD

(75) Inventor: Fred W. Huntzicker, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/328,533

(22) Filed: Jan. 10, 2006

(65) Prior Publication Data

US 2006/0170532 A1 Aug. 3, 2006

Related U.S. Application Data

(63) Continuation of application No. 10/643,731, filed on Aug. 19, 2003, now Pat. No. 7,015,791.

(51) Int. Cl.
*G05B 19/00* (2006.01)
*G06F 7/00* (2006.01)
*G06K 19/00* (2006.01)
*H04B 1/00* (2006.01)
*H04Q 1/00* (2006.01)

(52) U.S. Cl. ................ 340/5.54; 340/5.85; 340/825.69; 340/825.72; 341/173; 341/176; 713/164

(58) Field of Classification Search ................ 340/5.54, 340/5.85, 825.69, 825.72; 341/173, 176; 713/164
See application file for complete search history.

(56) References Cited

U.S. PATENT DOCUMENTS

| | | | | |
|---|---|---|---|---|
| 4,754,255 | A * | 6/1988 | Sanders et al. | 340/5.54 |
| 4,757,304 | A * | 7/1988 | Rho | 340/539.11 |
| 5,077,831 | A * | 12/1991 | Weber | 340/5.54 |
| 5,252,960 | A * | 10/1993 | Duhame | 340/5.64 |
| 5,442,341 | A * | 8/1995 | Lambropoulos | 340/5.72 |
| 5,955,981 | A * | 9/1999 | Rangan | 340/5.72 |
| 6,617,975 | B1 * | 9/2003 | Burgess | 340/539.11 |
| 7,015,791 | B2 * | 3/2006 | Huntzicker | 340/5.54 |

* cited by examiner

*Primary Examiner*—Brian A Zimmerman
*Assistant Examiner*—Nam V Nguyen

(57) ABSTRACT

Methods and apparatus are provided for a key-less system for actuating a lock responsive to a valid OPEN signal. A first portion is continuously coupled to a power source and a second portion receives power from the source only when a coupling switch is ON. The first portion comprises a keypad for entry of a lock actuation code, and a detector that senses the first keystroke and turns the switch ON. The second portion includes an RF transmitter and preferably a memory with valid actuation codes stored therein, and a processor coupled to the memory, to the keypad and to the RF transmitter. When the entered and stored keystrokes match, the RF transmitter sends an OPEN signal to the lock. The method comprises detecting the first keystroke, turning on the power switch ON, comparing the entered and stored keystrokes and if matched, transmitting an OPEN command to the lock.

19 Claims, 5 Drawing Sheets

KEYLESS ENTRY MODULE AND METHOD

CROSS-REFERENCES TO RELATED APPLICATIONS

This is a continuation of application Ser. No. 10/643,731, filed Aug. 19, 2003 now U.S. Pat. No. 7,015,791.

TECHNICAL FIELD

The present invention generally relates to a keyless entry or activation system and method, and more particularly, a key-less entry or activation system and method suitable for vehicles or other equipment already adapted for fob-type key-less entry or equivalent.

BACKGROUND

Modern vehicles and other equipment are often equipped for remote entry control using a fob-type key device. A fob-type key device is a small, pocket-sized, radio-frequency (RF) signaling device, usually attached (like a fob) to the same key ring holding the mechanical ignition key (or other control key). By pressing a switch button on the fob-type key, the user is able to remotely open the door(s) and/or turn on a portion of the vehicle or other equipment without having to insert a mechanical key in a mechanical lock. This is a great convenience and an attractive safety feature. The fob-type keyless entry works by sending a coded RF signal to a receiver-decoder-actuator in the vehicle. This in-car system unlocks the door and/or performs other predetermined functions when it detects a valid "OPEN" code or equivalent on the RF signal received from the fob.

A disadvantage of such arrangement is that the fob-type key must be brought into the vicinity of the vehicle for it to function. Thus, the user must carry the fob-type key with him or her in order to be able to use it. Under these circumstances, the physical security of the fob-type key is essential for preventing unauthorized entry into the vehicle. If the fob is lost or stolen, vehicle security is compromised.

Sometimes vehicles are provided with key-less entry systems where the user only needs to remember a door code (e.g., a vehicle PIN number) and need not carry the electronic or mechanical key along. This eliminates the security risk arising from having to carry the key. Such key-less entry systems usually have the form of a small keypad built into the door of the car. To gain access to the vehicle, the user merely enters his or her personal entry code into the keypad and the door is automatically unlocked by the vehicle electronic system. A physical key or remote fob-type key is not needed. This arrangement is well known and very useful. However such keyless entry systems are still only in limited use and are usually available only as a hard-wired, "factory installed" option. "Factory installed" means that the components needed to provide the key-less entry function are hard-wired into the car at the time of construction and cannot be easily added afterward, for example, as a "dealer installed" or "after-market" option. This is a significant limitation.

Accordingly, it is desirable to be able to provide a keyless entry or activation system that is easily installed after a vehicle (or other equipment or structure) is manufactured and that does not depend on a factory installed keypad or keypad wiring harness. In addition, it is desirable that such an "after market" system be simple to install and operate, be of comparatively low cost and still have an appearance and function substantially equivalent to a factory installed system. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a key-less system for actuating a lock responsive to a valid OPEN command. The apparatus comprises a power source, a first system portion coupled to the power source and receiving power therefrom while the system is in an active or inactive state, a second system portion coupled to the power source by a switch and receiving power therefrom and in an active state only when the switch is ON, wherein the first portion comprises: a keypad having one or more keys that when depressed provide an electronic signal representing an entered actuation code, and a detector coupled to the keypad that intercepts at least a first keystroke of the multiple keys and in response to the first keystroke turns the switch ON, thereby making the second system portion active; wherein the second portion comprises: a memory with one or more valid actuation codes stored therein, a processor coupled to the memory and the keypad, wherein the processor receives from the keypad, keystroke sequences representing the entered actuation code and compares them to valid actuation codes retrieved from the memory to detect a match, and a transmitter coupled to the processor, wherein when the processor detects the match, the transmitter sends out an RF signal carrying a valid OPEN command recognizable by the lock. In a preferred embodiment, the transmitter uses the same RF signal for the OPEN command as a fob-type keyless entry device to which the lock is already responsive, thus taking advantage of the receiver-decoder-lock control system already present in a vehicle.

A method is provided for key-less entry using a keypad, a keystroke detector and a power switch coupled to a processor, a memory and a transmitter, for remotely actuating a lock responsive to an "OPEN" command. The method comprises, detecting at least a first keystroke, turning the power switch ON in response to detecting the at least first keystroke thereby preferably powering up the processor, memory and at least the transmitter, receiving keystrokes from the keypad and comparing the received keystrokes to one or more valid entry codes stored in the memory, and if a match, transmitting an RF signal containing the OPEN command to the lock.

BRIEF DESCRIPTION OF THE DRAWINGS

The present invention will hereinafter be described in conjunction with the following drawing figures, wherein like numerals denote like elements, and FIGS. 1-3 are simplified exterior views of the key-less entry module of the present invention, wherein FIG. 1 is a top view, FIG. 2 is a side view and FIG. 3 is an end view;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
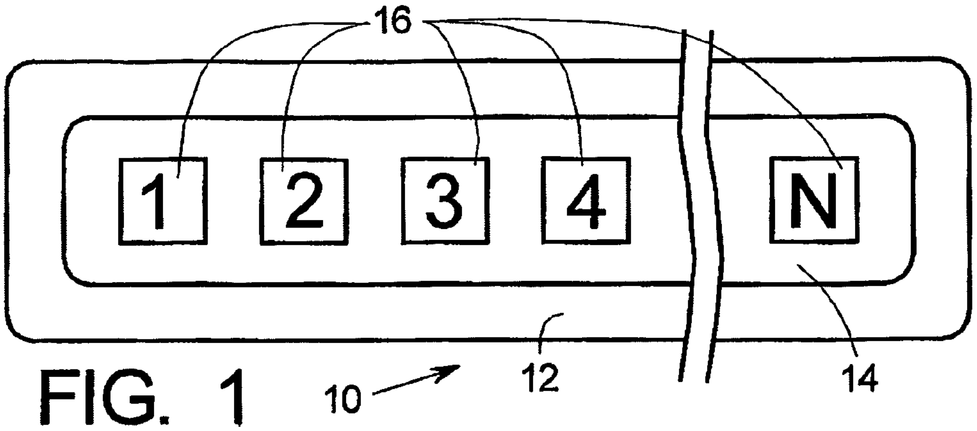
Figure 2:
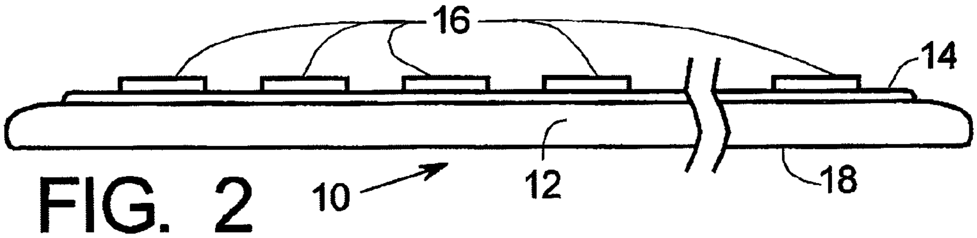
Figure 3:
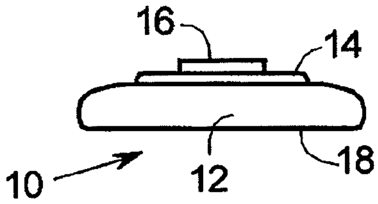

FIGS. 1-3 are simplified exterior views of key-less entry module 10 of the present invention, wherein FIG. 1 is a top view, FIG. 2 is a side view and FIG. 3 is an end view. Key-less entry module 10 has external case 12, decorative or other feature 14 and function keys 16. Function keys 16 are conveniently labeled 1, 2, 3, 4, . . . , N. Persons of skill in the art will understand that the labels 1, 2, 3, 4, . . . , N are merely for convenience of explanation and not intended to be limiting. Letters such as A, B, C, . . . , etc., or a combination of letters and numbers, or any other type of distinctive symbol or character could also be used. While module 10 shows only a single row of N keys 16, this is merely for convenience of explanation and multiple rows of more or fewer keys can be used. The invention does not depend upon the exact number of digits or characters in the entry code. Further, the array of N keys need not be linear, but can be circular, square, rectangular and so forth. Any number and arrangement of the keys can be used. However the number of keys N and the number of characters M in the entry code should be large enough to discourage trial and error as a means of unauthorized entry into the vehicle and small enough so as to not be unduly difficult for the user to enter. Useful values of N are from 1 to 15, more conveniently 4 to 6, and preferably about 5. The entry code M can be longer or shorter than the number N of physical keys 16 since some characters or digits can be used more than once. For example, with N=4 and the keys labeled 1, 2, 3, 4, an M=6 digit entry code (e.g., 4, 2, 3, 1, 2, 1) can be entered by repeating some characters. This example provides $4\times4\times4\times4\times4\times4=4096$ possible code combinations. Conversely more keys 16 than entry characters can be provided (N>M) and some keys not used when entering the access code. Either arrangement is useful. Thus, variable code lengths M are possible even though N is fixed. It is desirable that the user be able to select the code length M so that, among other things, it can be different for different functions, e.g., one length for unlock or initial activation functions and another length for subsequent command functions. Alternatively, as few as one key can be used and the key-code sequence entered in a Morse-Code like fashion, where the time duration of the key-press and the sequence of different time duration key-presses embody the key sequence code.

For convenience of explanation and not intended to be limiting, the present invention is described for the situation where it is being used to provide door entry and security for a vehicle, that is, as a key-less vehicle entry system. However those of skill in the art will understand that the present invention is not limited merely to vehicles and can be applied to any situation where key-less entry or key-less equipment activation is desired. As used herein, the words “entry”, “vehicle”, “key-less entry” and “key-less vehicle entry” are intended to include such other applications, for example but not limited to: equipment activation and deactivation, locking or unlocking doors in boats, planes and structures other than cars, turning lights on and off, activating and deactivating alarm systems or other machinery or equipment, and so forth. Further, the present invention is described in terms of performing an “open” or “unlock” function, but this is merely for convenience of explanation and not intended to be limiting. Persons of skill in the art will understand that the functions performed by the present invention can activate and deactivate various vehicles and other subsystems, as for example and not intended to be limiting, sounding a horn or other alarm, turning lights on or off, starting and stopping the engine or motors, locking and unlocking doors and other latches, opening and closing windows, and so forth. The functions performed depend on the user’s requirements.

Figure 4:
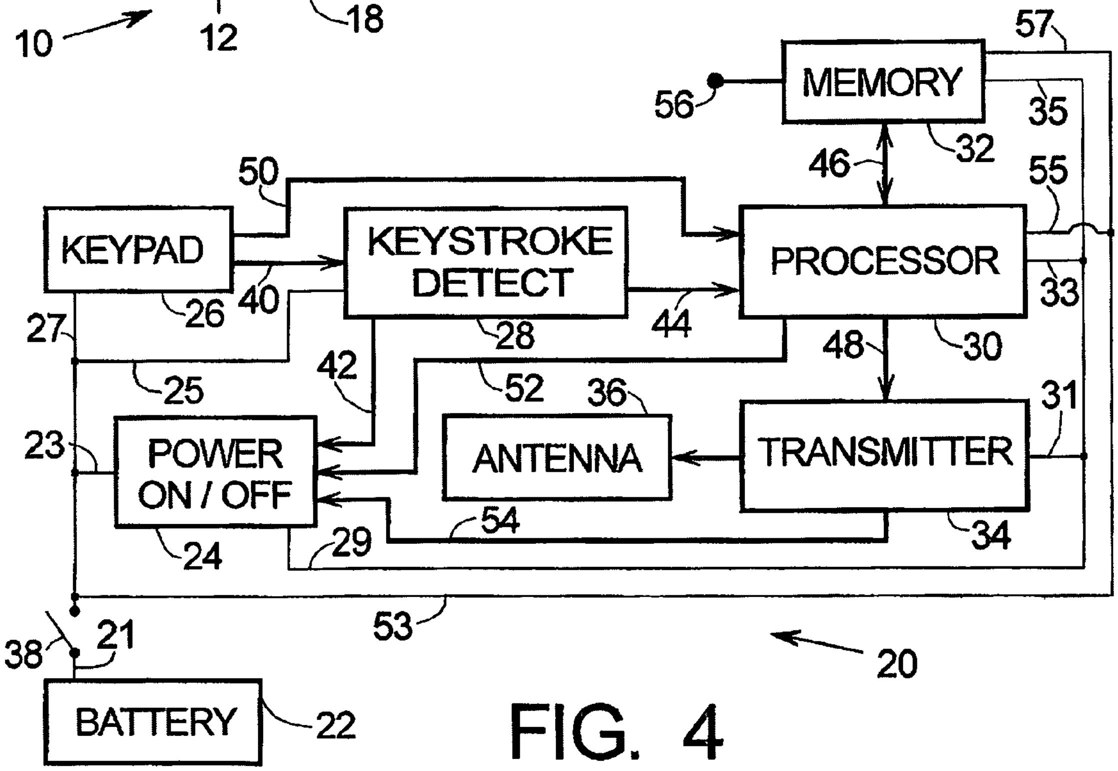
FIG. 4 is a simplified schematic block diagram of the electrical system contained in the keyless entry module of the present invention.

FIG. 4 is a simplified schematic block diagram of electrical system 20 contained in keyless entry module 10 of the present invention. Electrical system 20 comprises battery or other energy source 22, power ON/OFF switch 24, keypad 26 (e.g., containing N keys 16 of FIG. 1) on which a predetermined entry code is to be entered, keystroke detector 28, keystroke processor 30, memory 32 for storing predetermined entry codes (there can be more than one), transmitter 34 and antenna 36. As used herein, the word “battery” is intended to include any type of power source and the words “transmitter” and “transmit” are intended to refer to any type of electromagnetic wave signaling device, whether RF or optical or infra-red or other or a combination thereof.

Keypad 26 contains N user operable keys 16 (see FIG. 1). Under each key 16 is an electrical switch. Battery 22 is coupled via leads 21, 23, 25, 27 to power ON/OFF switch 24, to keypad 26 and to keystroke detector 28. Elements 24, 26, 28 desirably receive power from battery 22 at all times, that is, whenever module 10 is intended to be available for use. Disconnect switch 38 may be provided to reduce battery drain when module 10 is not in use but, generally, this is not necessary. With modern semiconductor devices, the stand-by current drain of power ON/OFF switch 24, keypad 26 and keystroke detector 28 is so low that disconnect switch 38 is not necessary. Thus, switch 38 may be omitted in most applications. Normally, whenever module 10 is quiescent, power ON/OFF switch 24 is in the OFF state, that is, not delivering power to elements 30, 32, 34 so that keystroke processor 30, memory 32 and transmitter 34 are inactive. When power ON/OFF switch 24 is in the ON state, processor 30, memory 32 and transmitter 34 are active.

When a user depresses any of keys 16 of keypad 26 on module 10, an electrical signal is sent via lead or bus 40 to keystroke detector 28. Keystroke detector 28 is conveniently a state machine or circuit whose purpose is to determine that a key on module 10 has been depressed. Keystroke detector 28 then sends a signal via lead or bus 42 to Power ON/OFF switch 24 causing power ON/OFF switch to turn ON. When power ON/OFF switch turns ON, it provides power to DC lead 29 and thereby via leads 31, 33, 35 to memory 32, processor 30, and transmitter 34. Thus, a purpose of keystroke detector 28 is to wake up or power-up the rest of system 20 as soon as any of keys 16 is activated. If keystroke detector 28 fails to detect further keystrokes or fails to detect further keystrokes corresponding to an attempt to enter an entry code, then it causes Power ON/OFF switch 24 to turn OFF again, conveniently via lead or bus 42. Power ON/OFF switch 24 desirably contains a self-timer that starts when switch 24 turns ON and that causes switch 24 to turn OFF state after a predetermined delay. Alternatively, the timing function can be built into detector 28 or processor 30 or provided by a separate time delay element. Any arrangement suffices.

The keystroke signals from keypad 26 are passed via lead or bus 44 or 50 to keystroke processor 30. While FIG. 4 shows the output of keypad 26 passing through detector 28 to processor 30 via leads or buses 40 and 44, this is merely for convenience of explanation and not intended to be limiting. As those of skill in the art will appreciate based on the description herein, the signals from keypad 26 can also pass directly to processor 30, for example, via lead or bus 50.

Keystroke processor 30 receives the keystrokes entered into keypad 26 and compares them with entry code words that it retrieves from memory 32 via bus or lead 46. A plurality of valid entry codes can be stored in memory 32. This provides for individualized entry codes, that is, if several people use the same vehicle or equipment or facility equipped with key-less entry module 10, each person can have his or her own entry code. If processor fails to detect a match, then it causes switch 24 to turn OFF, via lead or bus 52. If desired, each time a match is obtained, the event and the code used can be logged and stored in memory 32 for later read-out. Alternatively, this information may be transmitted to and stored in the onboard vehicle or equipment or structure entry control system. External connection bus connection or lead 56 is conveniently provided to memory 32 for entering valid codes into memory 32 and retrieving usage data such as discussed above that is temporarily stored in memory 32. Appropriate data buffers (not shown) may be provided to facilitate code entry and data retrieval.

When a match is obtained, then processor 30 passes a "SEND" command via lead or bus 48 to transmitter 34. Transmitter 34 then transmits an RF signal containing an "OPEN" (or other) command via antenna 36 that is recognized by the radio receiver and control logic of the door lock controller in the vehicle or equipment or structure as a proper command to unlock the door (the radio receiver and control logic are standard and are not shown). The target door then unlocks and other equipment (e.g., lights) may also be actuated or other functions performed corresponding to the transmitted command. No wiring is needed between module 10 and the door lock controller on the vehicle or equipment or structure. After transmitter 34 has sent the desired message, power ON/OFF switch 24 is directed via lead or bus 54 to revert to the OFF state.

Where the vehicle door lock controller already has a radio receiver adapted to receive an "OPEN" signal from a fob-type keyless entry unit, transmitter 34 preferably sends an identically coded signal, that is, the same signal as would be transmitted by the key-less entry fob. This eliminates the need for a separate receiver—decoder in the vehicle, thereby reducing the overall system cost and making retro-fit, after-market installation of key-less entry module 10 particularly convenient and inexpensive. By using the same coded RF signal as would be transmitted to the vehicle by a fob-type keyless entry unit, nothing within the vehicle needs to be changed nor any of the vehicle wiring disturbed. All that is required is to bring or mount key-less entry module 10 with radio range of the fob-type key-less entry radio receiver in the vehicle. Thus, a vehicle may be retro-fitted with key-less entry module 10 by, for example, attaching lower surface 18 of module 10 to the outside of the vehicle door in substantially the same place where a hard-wired factory installed keypad would have been located. Module 10 may be attached using adhesive, screws, rivets, a combination thereof or other means well known in the art. Module 10 does not need to connect to the vehicle wiring. From the point of view of the user, key-less entry module 10 of the present invention when installed on a vehicle equipped with a fob-type entry system does not require any wiring changes to the vehicle, and looks and acts substantially the same as a factory installed, "original-equipment" keypad entry system. This is a significant advantage. For vehicles not already equipped with a fob-type entry system, the vehicle portion of such system may be retrofitted as an after-market or dealer installed item, thereby permitting the vehicle (or equipment or structure) to operate in conjunction with key-less entry module 10. As those of skill in the art will understand based on the description herein, module 10 of the present invention is not limited merely to a transmitter—receiver combination mimicking a fob-type keyless entry system. Transmitter 34 of FIG. 4 may be adapted to transmit whatever coded signal is required by the receiver—decoder combination resident in the vehicle or equipment or structure desired to be opened, actuated or controlled. Means and methods for providing various types of coded signals for transmitter 34, that can be detected by the corresponding receiver-decoder combination in the target vehicle, equipment or structure are well known in the art. Thus, the present invention is also applicable under circumstances where a pre-existing fob-type keyless entry system is not present.

While it is preferable that power ON/OFF switch 24 control the power to processor 30 and memory 32, this is not essential and logic 30 and memory 32 may be connected full time to DC power bus 21 as indicated by DC lines 53, 55, 57, much as keypad 26 and keystroke detect module 28 are continuously connected. The use of low power circuitry can reduce the power drain from logic 30 and memory 32. However, transmitter 34 should be coupled to power source 22 through power ON/OFF switch 24 since it is likely to be the highest power consuming portion of system 20.

Figure 5:
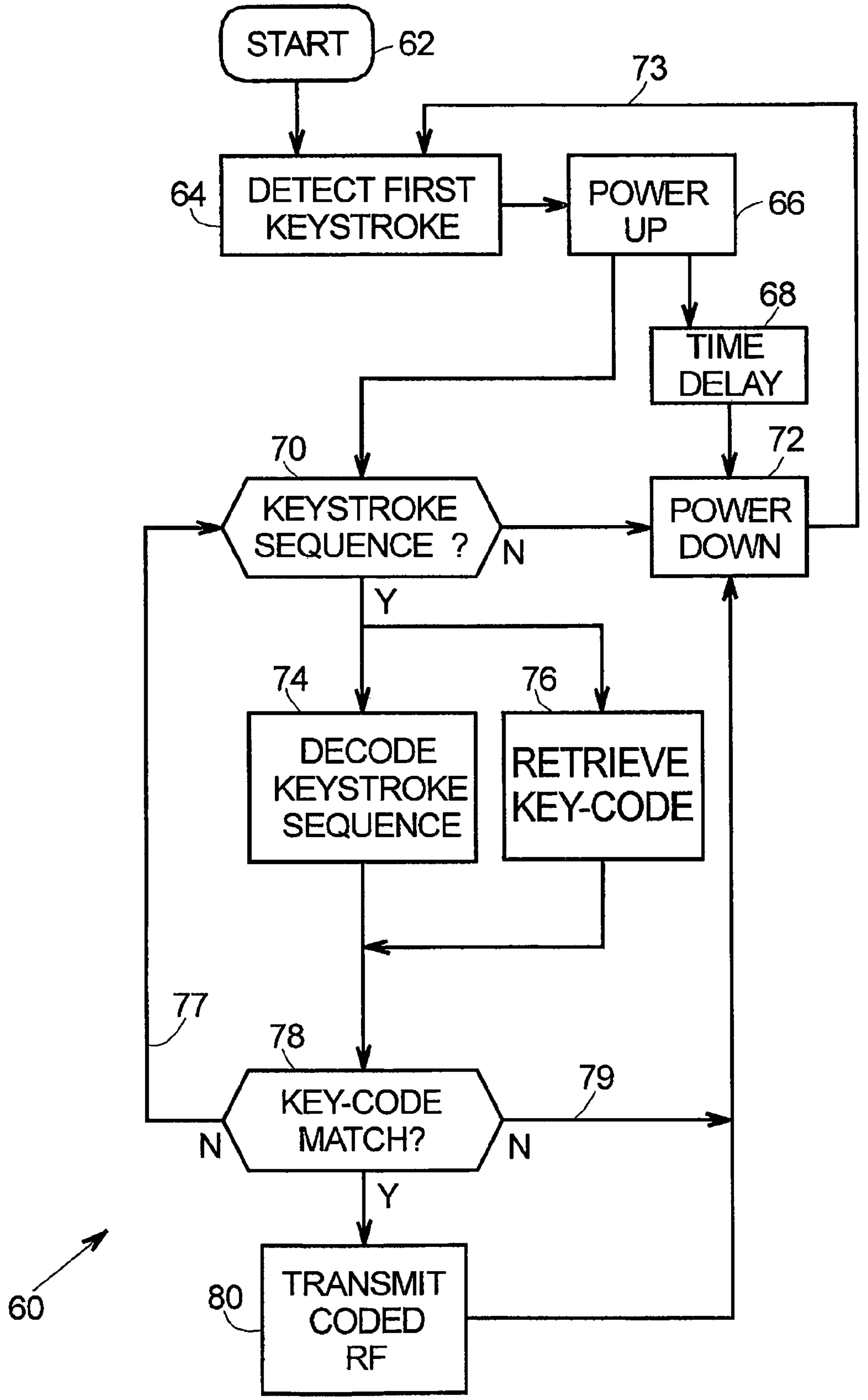
FIG. 5 is a simplified schematic flow chart of the method of the present invention.

FIG. 5 shows simplified schematic flow chart of method 60 of the present invention. Method 60 of FIG. 5 is carried out, for example, by electronic system 20 of FIG. 4 or equivalent. However, any general-purpose micro-controller or micro-computer interfaced to an appropriate transmitter and power switch can perform the logical functions illustrated in FIG. 5. Start 62 commences with DETECT FIRST KEYSTROKE step 64. Method 60 is dormant until a keystroke is detected in step 64. As long as no key is depressed, module 10 and system 20 remain quiescent.

When step 64 detects that a key has been depressed, then POWER-UP step 66 is performed so that power is supplied to the rest of key-less entry module 10, that is, those portions of system 20 that are not continuously connected to power source 22. Following POWER-UP step 66, TIME DELAY step 68 and KEYSTROKE SEQUENCE query 70 are performed, preferably but not essentially, in parallel. The function of TIME DELAY step 68 is to initiate POWER-DOWN step 72 after a predetermined time interval set by TIME DELAY step 68. While TIME DELAY step 68 is running (i.e., not timed out), KEYSTROKE SEQUENCE query 70 determines whether or not the keystrokes being received from keypad 26 of module 10 are a valid series of keystrokes or merely the result of one or more keys 16 of module 10 being bumped or module 10 picking up an interference signal. This step can be performed in keystroke detector 28 and/or processor 30. If the outcome of query 70 is NO (FALSE) then POWER-DOWN step 72 is performed, returning the system to its quiescent state. KEYSTROKE SEQUENCE query step 70 is desirable but not essential.

If the outcome of query step 70 is YES (TRUE) then steps 74, 76 are performed in any order or in parallel. In DECODE step 74, the sequence of valid keystrokes received from module 10, e.g., from keypad 26 of FIG. 4, are desirably converted to a digital word in a format suitable for being compared to stored information obtained from memory in RETRIEVE KEY-CODE step 76. RETRIEVE step 76 desirably obtains from memory 32 or equivalent, a digital word representing one or more valid key sequences for actuating key-less entry. DECODE step 74 and RETRIEVE step 76 can be performed in any order or performed in parallel, as shown by way of example in FIG. 5. The digital code word(s) may be stored in memory 32 in the same format as keystrokes are received from keypad 26 or in any other convenient format. The outcome of DECODE step 74 and RETRIEVE step 76 are compared in KEY-CODE MATCH query 78 where it is determined whether or not the received key sequence is the same as the stored key sequence. Steps 74, 76, 78 are conveniently carried out by processor 30 in conjunction with memory 32. If the outcome of MATCH query 78 is NO (FALSE) then control is optionally passed back to query 70 via outcome branch 77 to see whether the user will attempt to re-enter another keystroke sequence. This is to conveniently accommodate a user's failure to get it right the first time. Alternatively, when the outcome of MATCH query 78 is NO (FALSE) then control is optionally passed to POWER-DOWN step 72 via outcome branch 79 to return system 20 to its quiescent state. Either arrangement is useful. Variable length codes should be accommodated. Persons of skill in the art understand how to go about comparing variable length entered code words against stored code words, also of varying length. Among other things, this is to accommodate users who may select and store code words of different lengths.

If the outcome of MATCH query 78 is YES (TRUE), that is, the entered keystrokes match the stored keystrokes, then TRANSMIT step 80 is performed, otherwise step 80 is not performed. TRANSMIT step 80 sends a radio or optical or infra-red or other wireless signal that will be recognized by the vehicle door control system as a valid "OPEN" or "ACTUATE" command or a combination thereof. Where the vehicle is already equipped for a fob-type entry device, TRANSMIT step 80 sends a signal identical to or compatible to the signal that would be sent by the fob-type entry device. Such signals are generally coded as a security feature, hence the designation of step 80 as a TRANSMIT CODED RF step. The designation "radio-frequency" and the abbreviation "RF" are intended to include electromagnetic radiation of any frequency. Further, any form of coding may be used. In general, the type of coding used is determined by what the vehicle, structure, or equipment control or access system is designed to receive and interpret. Persons of skill in the art will understand what type of coding is needed and how to implement it depending upon the particular type of receiver and control or access system involved.

Following step 80, POWER-DOWN step 72 is performed. POWER-DOWN step 72 may result from several causes including the completion of TIME DELAY from step 68, the outcomes of query steps 70 or 78, or the completion of TRANSMIT step 80. POWER-DOWN step 72 returns module 10 and system 20 to its quiescent state and, as shown via path 73, wherein it awaits another keystroke signal from keys 14 at step 64.

Figure 6:
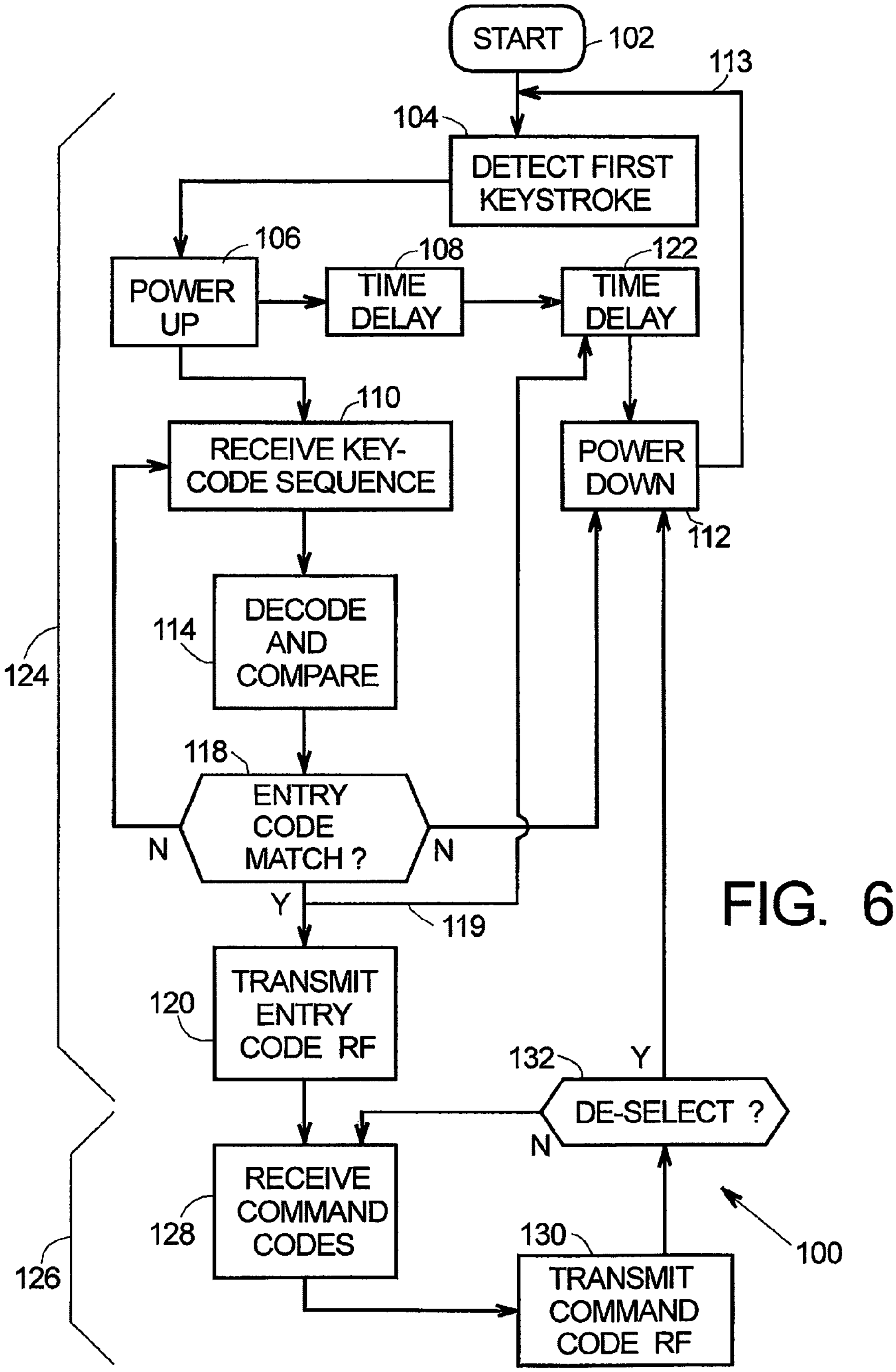
FIG. 6 is a simplified schematic flow chart of the method of the present invention according to a further embodiment.

FIG. 6 is a simplified schematic flow chart of method 100 of the present invention according to a further embodiment. Method 100 begins at 102 with DETECT FIRST KEYSTROKE step 104 analogous to step 64 of FIG. 5. When a first keystroke is detected, then POWER-UP step 106 is executed analogous to step 66 of FIG. 5, thereby supplying power to those portions of system 20 that are not ordinarily connected to power source 22. This includes at least transmitter 34. Time delay step 108 analogous to step 68 of FIG. 5 is initiated, whereby a timer begins a countdown to automatically initiate POWER-DOWN 112 step after a predetermined interval that can depend on the outcome of subsequent steps.

Entered key sequences are received in RECEIVE KEY-CODE SEQUENCE step 110. The entered key sequence is decoded and compared in step 114 with stored key-code values retrieved from memory 32, analogous to steps 74, 76 of FIG. 5. Query 118, analogous to query 78 or FIG. 5, determines whether or not there is a match between the entered key sequence and the stored key sequence. If the outcome of query 118 is NO (FALSE) then as previously discussed, control is returned to step 110 to receive a second attempt or passed to POWER-DOWN step 112. Either arrangement is useful and may be chosen by the designer or may be user selectable. If the outcome of query step 118 is YES (TRUE) then in TRANSMIT ENTRY CODE RF step 120, analogous to step 80 of FIG. 5, a coded RF signal corresponding to an allowed entry or actuation code is sent to the vehicle receiver-lock controller system. Also, as shown by outcome line 119, additional TIME DELAY step 122 is actuated (or Time Delay step 108 reset) so that the time from DETECT FIRST KEYSTROKE step 104 until POWER-DOWN step 112 is extended while the system is in the COMMAND mode, that is ready to receive and send COMMAND CODES in steps 128, 130.

Steps 104 to 118 as shown by bracket 124 represent the INSECURE mode of operation of system 20 and module 10 and the associated vehicle. This also applies to FIG. 5. That is, from START 62, 102 to the outcome of detecting a CODE MATCH at step 78, 118 and/or TRANSMITTING ENTRY CODE RF in step 80, 120 is referred to as being in INSECURE mode 124. Once the proper entry code has been transmitted in step 80, 120, then the vehicle is in a state where it recognizes that the proper entry code has been given and can receive further commands without additional code-matching for security purposes. Thus, as shown by bracket 126 steps 128, 130, 132 represent the SECURE or COMMAND mode of operation, that is, additional commands received from keypad 126 in RECEIVE COMMAND CODES step 128 can be transmitted to the vehicle in TRANSMIT COMMAND CODE RF step 132 without resorting to code matching using allowed codes stored in memory 32, although this is not precluded. TIME DELAY step 122 may include a long, fall-back time delay, that is, once the system is in the secure COMMAND mode, it remains powered-up until manually shut down by the user in DE-SELECT step 132 or until the long fall-back time delay set is step 122 has elapsed.

Figure 7:
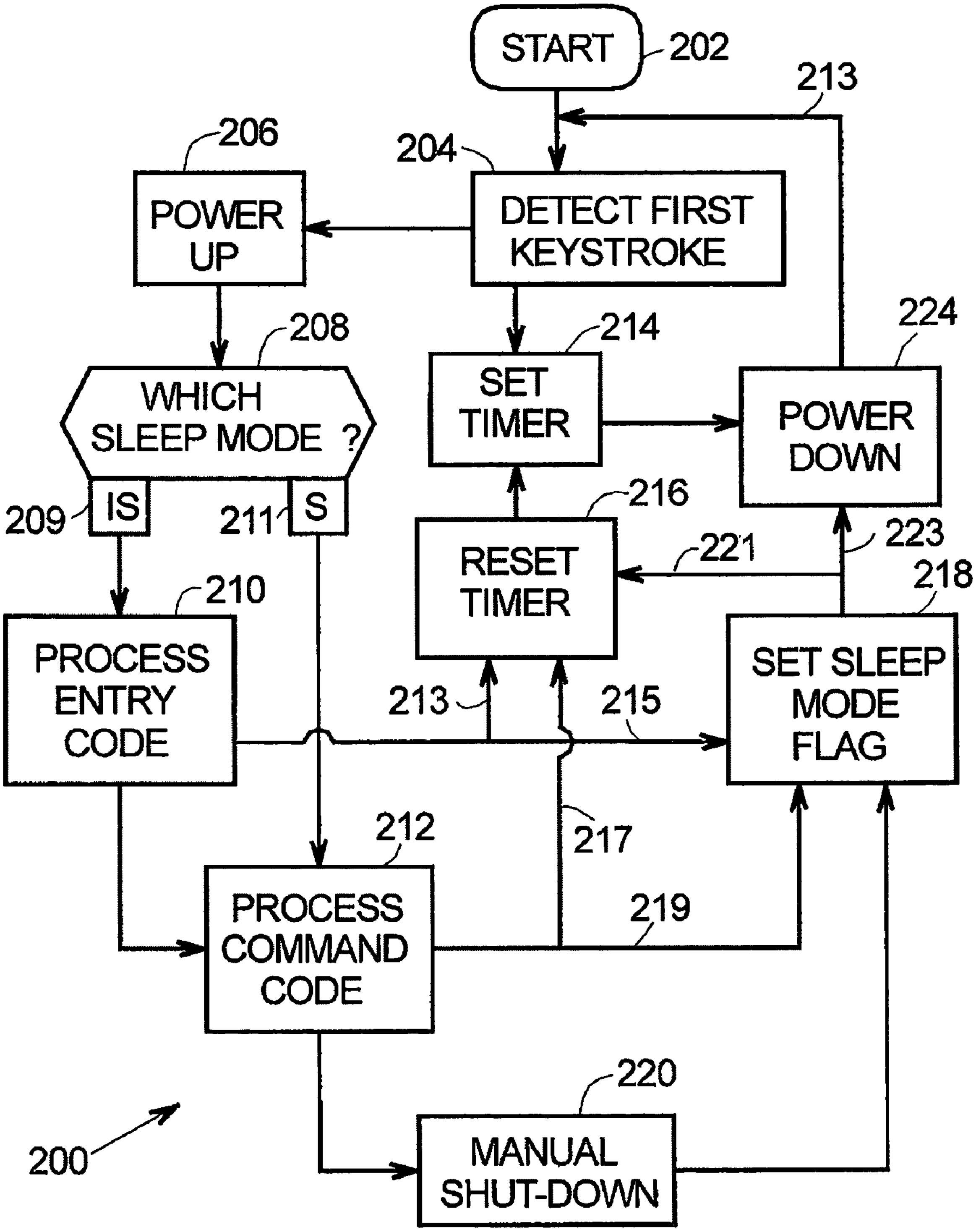
FIG. 7 is a simplified schematic flow chart of the method of the present invention according to a still further embodiment.

FIG. 7 is a simplified schematic flow chart of method 200 of the present invention according to a still further embodiment. Method 200 differs from methods 60, 100 in that two powered-down (sleep) modes are provided, that is, method 200 can have system 20 POWER-DOWN in insecure mode 124 or in secure mode 126. If system 20 is powered-down (put to sleep) in insecure mode 124, then when re-awakened by a POWER-UP step, the complete entry or unlock key-sequence must be keyed-in and matched for the system to function. If system 20 is powered-down (put to sleep) in secure mode 126, then when reawakened by a POWER-UP step, the complete entry or unlock sequence of keystrokes need not be entered and the system returns directly to the secure mode of operation, ready to accept a COMMAND key sequence. Once in the secure mode, the user can choose which sleep mode will be used.

Method 200 begins at 202 with DETECT FIRST KEYSTROKE step 204 analogous to step 64 of FIG. 5 and step 104 of FIG. 6. When a first keystroke is detected, then POWER-UP step 206 is executed analogous to steps 66, 106, thereby supplying power to those portions of system 20 that are not ordinarily connected to power source 22. This includes at least transmitter 34. Either in series or in parallel and in either order, SET TIMER step 214 is executed before, during or after POWER-UP step 206. SET TIMER step 214 has the function of establishing a predetermined time delay after which the system powers-down (e.g., step 224). This is to insure that unless specifically commanded by the user or a subsequent step in method 200, system 20 reverts to a sleep (powered-down) mode after an interval in which nothing is happening (e.g., no further keystrokes). The time delay provided by SET TIMER step 214 may altered by subsequent steps in method 200, e.g., step 216.

Query 208 determines which sleep mode was selected or which security mode was in use before the last power down. Query 208 has two outcomes, either insecure (IS) mode 209 or secure (S) mode 211. If the sleep state corresponds to insecure (IS) mode 209, then method 200 flows to PROCESS ENTRY CODE step 210 wherein the sequence of keystrokes necessary to unlock the system are received, compared to the entry stored in memory 32, and an "UNLOCK" or "OPEN" message sent to the vehicle receiver by transmitter 34, as has been previously described in connection with FIGS. 5-6. Step 210 corresponds to the combination of steps 70, 74, 76, 78, 80 in FIG. 5 or 110, 114, 118, 120 in FIG. 6.

If the sleep state corresponds to secure (S) mode 211, then method 200 by-passes PROCESS ENTRY CODE step 210 and goes to PROCESS COMMAND CODE step 212, wherein one or more command code key sequences can be sent to the vehicle via transmitter 34 to turn lights on or off, actuate various other equipment and so forth, as desired by the user, without repeating the entry or unlock key sequence. PROCESS COMMAND CODE step 212 corresponds to steps 128, 130 of FIG. 6 and is only performed in the secure (S) mode or after PROCESS ENTRY CODE step 210 has been successfully completed. If PROCESS ENTRY CODE step 210 has not been successfully completed the system remains in the IS mode.

The output of PROCESS ENTRY CODE step 210 desirably flows to RESET TIMER step 216 as shown by path 213 and to SET SLEEP MODE FLAG step 218 as shown by path 215. RESET TIMER step 216 insures that sufficient time is left in the powered-up condition for additional COMMAND keystrokes can be received from keypad 26 and sent out by transmitter 34 in PROCESS COMMAND CODE step 212. Similarly the output of PROCESS COMMAND CODE step 212 desirably flows to RESET TIMER step 216 via path 217 and to SET SLEEP MODE FLAG step 218 via path 219. The output of PROCESS COMMAND CODE step 212 also flows to optional MANUAL SHUT-DOWN step 220 whose output flows to SET SLEEP MODE step 218. In SET SLEEP MODE step 218, a flag is set in system 20 indicating whether the system should reawaken in insecure (IS) mode 209 or secure (S) mode 211. This capability is readily provided as a part of or incorporated in keystroke detect element 28 and/or processor element 30 and memory 32 of FIG. 4. The sleep mode flag may be conveniently stored in memory 32 or elsewhere. Persons of skill in the art will understand how to include and program the logic needed to provide a mode state flag.

When the outcome of step 210 flows to step 218, IS flag 209 is preferably set. When the outcome of step 212 flows to step 218, S flag 211 is preferably set. However, the user may choose which sleep mode flag will be set in step 220 which operates in parallel with pathways 215, 219 and can over-ride the default values flowing from steps 210, 212. Once SET SLEEP MODE step 218 has been executed, method 200 desirably flows directly to POWER-DOWN step 223, if immediate shutdown is desired or indirectly to POWER-DOWN step 224 through steps 216, 214 if delayed shutdown is desired. Any arrangement for causing an immediate or timed shutdown can also be used. System 20 desirably powers-down into the sleep mode set by step 218. If for some reason, step 218 has not been executed when step 224 is executed, system 20 desirably defaults to IS mode on POWER-DOWN. After POWER-DOWN step 224 then, as shown by outcome path 213, system 20 returns to START 202 and step 204 to await detection of the first keystroke. As a result of POWER-DOWN step 224, only those portions of system 20 needed to detect the first keystroke and to maintain the sleep mode flag need be active and still coupled to power source 22. The remaining portions of system 20 are desirably disconnected by POWER ON/OFF switch 24, but this is not essential.

Figure 8:
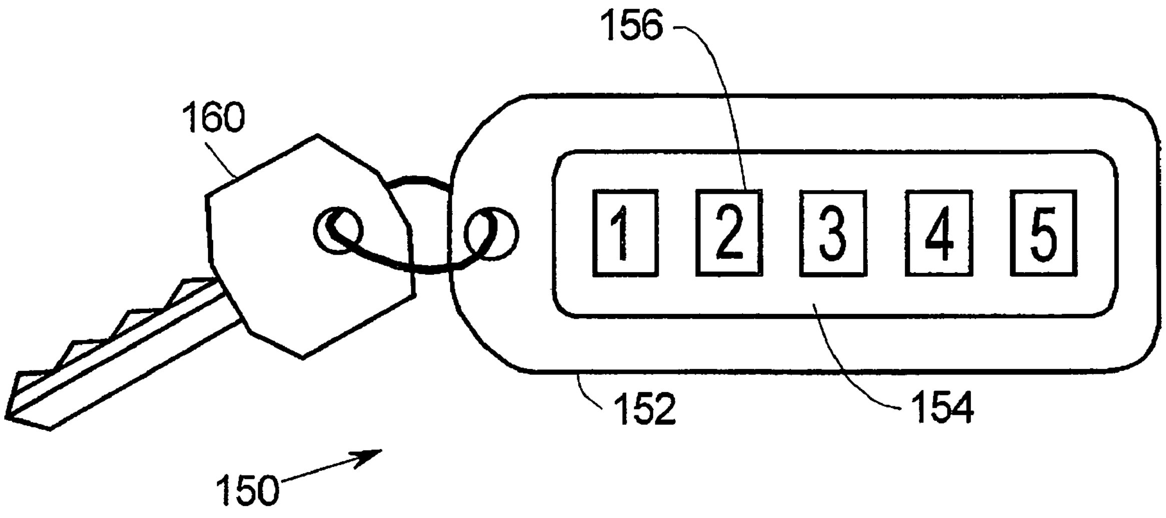
FIG. 8 is a simplified top exterior view similar to FIG. 1 but of a further embodiment of the present invention.

FIG. 8 is a simplified top exterior view similar to FIG. 1 but of module 150 according to a further embodiment of the present invention. Module 150 is analogous to module 10 of FIG. 1, but having additional features. Module 150 has case 152, boss 154 and entry keys 156 analogous to elements 12, 14, 16 of FIG. 1. Module 150 is conveniently of a size that it can be carried like a fob attached to vehicle or other mechanical key 160. Module 150 is a dual-mode device, that is, it can function either as a conventional keyless entry fob whereby vehicle unlock is achieved by pressing only one of keys 156 (selected by the user) or as a keyless entry fob of the type described in connection with FIGS. 1-6.

For example, when the user enters a predetermined key sequence, processor logic 30 in combination with memory 32 (see FIG. 4) recognizes the sequence as a function altering command, whereupon, it interprets the next keystroke(s) as a toggle command switching the function of module 150 from, for example, Mode-A requiring a sequence of keystrokes to gain entry and/or actuate a vehicle function as has already been discussed in connection with FIGS. 1-7, or Mode-B a standard prior-art fob-type behavior where only a single key-press is needed to unlock the vehicle or actuate a predetermined function. Thus, the user is able to select the properties that he or she desires module 150 to have depending upon the circumstances at the time. For example, module 150 can be left in the fob-type state (Mode-B) most of the time where physical security of the fob and key is not an issue and quick lock-unlock characteristics are desirable, and then switched to Mode-A when physical security of the key and key-module is difficult or impossible to provided (e.g., at the beach) and the user has to leave the module unsecured. In Mode-A entry cannot be obtained nor commands actuated without knowing the M-digit entry code and any subsequent command codes. Mere physical possession of module 150 does not compromise vehicle security in Mode-A. This is a great convenience and very useful.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a key-less fob comprising, operatively coupled, a keypad, processor, memory and transmitter, for remotely actuating a system responsive to RF signals from the transmitter, the method comprising:

receiving multiple initial keystrokes from the keypad in an initial operating mode;

during a fist timeout period associated with the initial operating mode, comparing the received initial keystrokes to a plurality of valid codes stored in the memory and, in response to the initial keystrokes matching a first one of the plurality of valid codes, directing the transmitter to actuate at least a portion of the system; and in response to a second keystrokes matching a second one of the plurality of valid codes different from the first one of the plurality of valid codes stored in the memory, switching the key-less fob from the initial operating mode to a command operating mode different from the initial operating mode where subsequent command keystrokes received after the initial keystrokes and prior to an expiration of a second timeout period each result in transmitting to the system a command adapted to remotely actuate at least a portion of the system, the command corresponding to the subsequent command keystroke, and being transmitted without repeating of the initial keystrokes during the second timeout period.

2. The method of claim 1, wherein the one or more command keystrokes comprise single individual keystrokes.

3. The method of claim 1, further comprising, data-logging at least the initial and one or more of the further key-strokes to provide a record of such key-strokes.

4. The method of claim 1, further comprising, after the transmitting step, determining whether the second timeout period has expired and if so, returning the key-less fob to the initial operating mode thereby requiring re-entry of the multiple initial keystrokes before the key-less fob can again enter the command operating mode.

5. The method of claim 1, wherein the key-less fob further includes a power ON/OFF switch and the method further comprises, before the receiving step, detecting at least a first keystroke, turning the power switch ON in response to detecting the at least first keystroke, thereby powering-up at least the transmitter.

6. The method of claim 5, further comprising turning the power switch OFF after the expiration of the first timeout period.

7. The method of claim 5, wherein the step of turning the power switch ON, comprises, powering-up the memory and the processor as well as the transmitter.

8. A method of operating a wireless key-fob comprising, operatively coupled, at least an ON/OFF switch, a keypad, a processor, a memory and a transmitter adapted to remotely actuate a vehicle system in an INSECURE and a SECURE mode when ON, the method comprising:

in response to an initial keystroke, setting the ON/OFF switch to an ON condition to thereby place the wireless key-fob in the INSECURE MODE, wherein the INSECURE MODE comprises a first timeout period;

while in the INSECURE MODE, sending initial ENTRY CODE keystrokes from the keypad to the processor;

using the processor to compare the initial ENTRY CODE keystrokes received from the keypad with a plurality of ENTRY CODE keystrokes stored in the memory to determine whether or not a valid ENTRY CODE has been provided;

if a first one of the plurality of valid ENTRY CODE keystrokes was provided in the INSECURE MODE, directing the transmitter to actuate the vehicle system;

if a second one of the plurality of valid ENTRY CODE keystrokes different from the first valid ENTRY CODE keystrokes was provided in the INSECURE MODE, shifting directly from the INSECURE MODE to a SECURE MODE, wherein the SECURE MODE is different from the INSECURE MODE, wherein the SECURE MODE comprises a second timeout period, and transmitting a signal to the system, the signal derived from the second one of the plurality of valid ENTRY CODE keystrokes and indicating that an authorized user is present;

while in the SECURE MODE, receiving subsequent command codes from the authorized user on the keypad and transmitting the subsequent command codes to the vehicle system without requiring repeating the initial ENTRY CODE keystrokes; and setting the ON/OFF switch to an OFF condition, wherein the setting takes place after the first timeout period when the wireless key-fob is in the INSECURE MODE and after the second timeout period when the key-fob is in the SECURE MODE.

9. The method of claim 8, wherein shifting to the SECURE MODE further comprises setting a flag in the memory indicating that the subsequent command codes can be accepted from the user without re-entry of the initial ENTRY CODE keystrokes.

10. The method of claim 9, wherein the subsequent command codes comprise fewer keystrokes than the initial ENTRY CODE keystrokes.

11. The method of claim 8, further comprising recording keystrokes entered in the INSECURE mode in memory for later retrieval.

12. The method of claim 11, further comprising also recording keystrokes entered in the SECURE mode in memory for later retrieval.

13. A key-less control fob adapted to be toggled between at least two modes of operation for actuating a remote system, comprising:

a user actuated keypad for entering keystroke sequences of variable lengths P and Q;

a processor operatively coupled to the keypad for receiving and analyzing keystroke sequences from the keypad;

a memory operatively coupled to the processor for storing valid keystroke sequences;

a transmitter operatively coupled to the processor for sending out signals containing commands adapted to actuate the remote system;

wherein, in a first mode of operation, the processor compares keystroke sequences entered on the keypad of length P to the keystroke sequences stored in the memory; and if the keystroke sequences match a first one of the plurality of valid keystroke sequences, the processor directs the transmitter to actuate the remote system; and if the keystroke sequences entered at the keypad match a second one of the plurality of valid keystroke sequences different from the first one of the plurality of valid keystroke sequences stored in the memory, then the processor switches operation of the fob to a second mode of operation different from the first mode of operation wherein subsequent keystroke sequences of length Q, wherein Q is less than P, cause the transmitter to send valid commands to the remote system based upon the subsequent keystroke sequences of length Q.

14. The key-less control fob of claim 13, wherein Q is not greater than 2.

15. The key-less control fob of claim 14, wherein $Q=1$.

16. The key-less control fob of claim 13, further comprising a time-delay operatively coupled to the processor and adapted to cause the processor to switch the fob from the second to the first mode of operation after a predetermined length of time without further keystrokes in the second mode.

17. The key-less control fob of claim 13, further comprising a power ON/OFF switch operatively coupled to the processor and at least two timers operatively coupled to or contained within the processor for providing first and second time delays since a last keystroke, wherein the first time delay applies when the key-less control fob is in the first mode of operation and the second time delay applies when the key-less control fob is in the second mode of operation, and upon expiration of either time delay, the power ON/OFF switch places the key-less control fob in a sleep mode.

18. The key-less control fob of claim 13, further comprising a power ON/OFF switch operatively coupled to the processor, wherein when the power ON/OFF switch is to be turned OFF, the processor stores in memory an indicator of the user desired mode of operation of the key-less control fob to be effective when the key-less control fob is reawakened by the power ON/OFF switch being turned ON.

19. The key-less control fob of claim 13, further comprising a power ON/OFF switch operatively coupled to the processor, wherein before the power ON/OFF switch is turned OFF, some or all of the keystrokes executed by the user since the power ON/OFF switch was last turned ON, are stored for later retrieval.

* * * * *